March 31, 1964 R. J. RENN 3,126,693
FLEXIBLE GRAIN PICKUP ELEMENTS AND MOUNTING
THEREFOR FOR HARVESTERS AND THE LIKE
Filed Oct. 8, 1962 2 Sheets-Sheet 1

INVENTOR
Reynold John Renn
by
HIS ATT'YS

March 31, 1964 R. J. RENN 3,126,693
FLEXIBLE GRAIN PICKUP ELEMENTS AND MOUNTING
THEREFOR FOR HARVESTERS AND THE LIKE
Filed Oct. 8, 1962 2 Sheets-Sheet 2
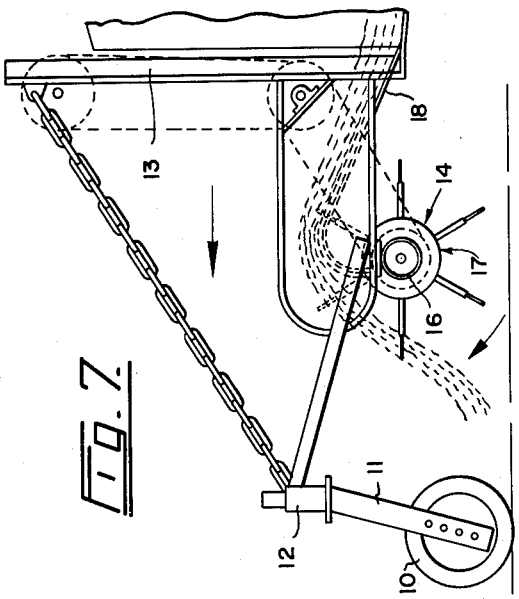
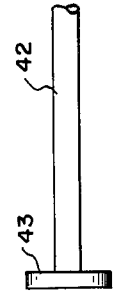
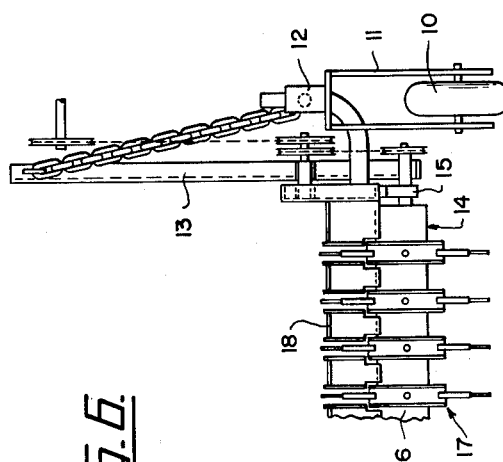
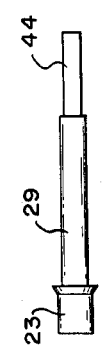
INVENTOR.
REYNOLD JOHN RENN
HIS ATT'YS

United States Patent Office 3,126,693
Patented Mar. 31, 1964

3,126,693
FLEXIBLE GRAIN PICKUP ELEMENTS AND MOUNTING THEREFOR FOR HARVESTERS AND THE LIKE
Reynold John Renn, 443 Riverdale Ave., Calgary, Alberta, Canada
Filed Oct. 8, 1962, Ser. No. 229,015
4 Claims. (Cl. 56—364)

My invention relates to new and useful improvements in pickup element assemblies for grain harvesters and the like.

Conventionally these pickup tines are manufactured from resilient material extending radially from the transverse member rotated by the source of power. However when these strike an object such as a stone or the like, they are often bent past their elastic limit and consequently remain bent or angulated thus detracting from their efficiency.

Furthermore many tines are made fairly rigid in order to overcome this disadvantage but this adds a further disadvantage that the tines can damage the supporting member or, alternatively, stones or dirt can be picked up thereby.

By providing a resilient anchor surrounding the tine carrying members and mounting resilient, bristle-like elements or tines within this anchor and extending radially therefrom, I provide a bristle-like element or tine which is resilient in all directions yet which is sufficiently rigid to operate as desired.

Furthermore by surrounding the major part of each individual element with a resilient sheath, the tips of the element remain fully resilient whereas the sheath adds a stiffening action to the element particularly adjacent its point of anchorage.

The principal object and essence of my invention is therefore to provide a device of the character herewithin described which permits a resilient mounting for resilient tines or bristle-like elements.

Another object of my invention is to provide a device of the character herewithin described in which the degree of resiliency varies along the length thereof.

A yet further object of my invention is to provide a device of the character herewithin described in which it is extremely simple to remove the element or tine carrying anchor, replace any or all of the tines, and replace the anchor upon the supporting member.

A further object of my invention is to provide a device of the character herewithin described in which the element or tine is resilient in all directions.

Still another object of my invention is to provide a device of the character herewithin described which is extremely simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 6 is a partial front elevation of a grain harvester with my device in situ.

FIGURE 7 is a side elevational view substantially at right angles to FIGURE 6.

FIGURE 9 shows an alternative form of tine or element.

FIGURE 10 shows a further alternative form of tine or element.

In the drawings like characters of reference indicate corresponding parts in the different figures.

Figures 1, 2:
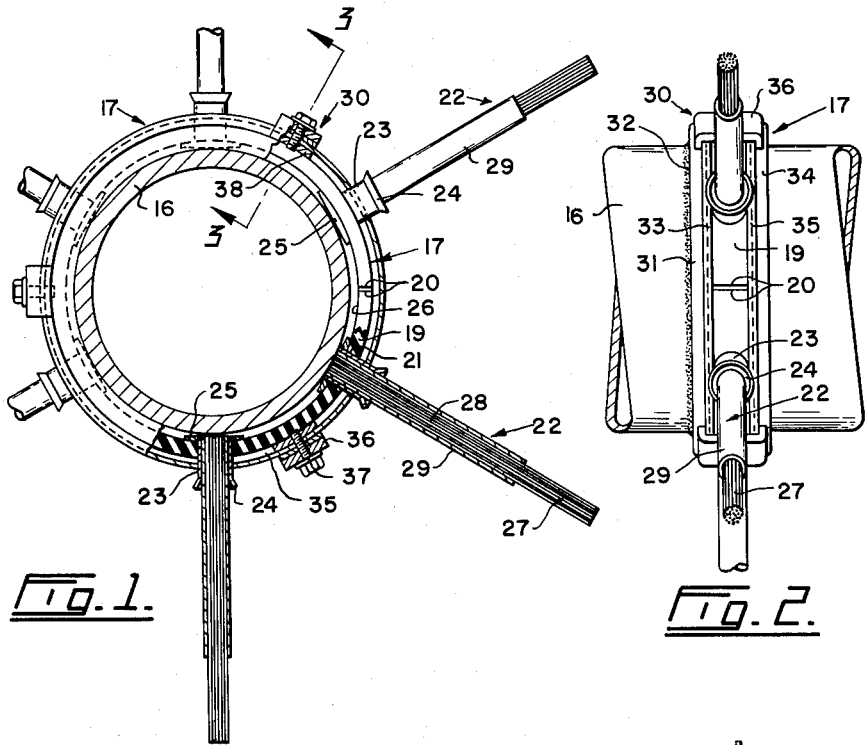
FIGURE 1 is a transverse section of the tine supporting component with parts broken away to show the interior thereof.
FIGURE 2 is a side elevational view substantially at right angles to FIGURE 1.

Proceeding therefore to describe my invention in detail, reference should first be made to FIGURES 6 and 7 which show a grain harvester including a supporting wheel 10 mounted within fork 11 and carried by offstanding member 12 from a frame member 13.

A transversely situated tine or bristle-like element carrying assembly collectively designated 14 is journalled within bearing 15 and extends transversely across the machine. This assembly includes a tube 16 having a plurality of tine or bristle-like element assemblies collectively designated 17 situated in spaced and parallel relationship therealong, grain guides 18 being situated between each of the assemblies in the conventional manner.

The member or tube 16 is shown in section in FIGURE 1 and each of the assemblies 17 comprises a resilient tine or bristle-like element anchor 19 made preferably of synthetic or lateral rubber or the like. Each of these anchors consists of an elongated strip which, when wrapped around the member 16, forms an annular anchor and it will be noted that the extremities 20 of the strip terminating in close relationship one with the other.

The strip is apertured as at 21 at intervals therearound to receive the tines or bristle-like elements collectively designated 22 which extend radially from the anchor in spaced relationship when in position around the member 16.

Each tine or element comprises a collar 23 having a flared end 24 at the outer end thereof to prevent undue wear occurring to the tine or element in use. The inner end of the collar is provided with an anchor washer 25 situated upon the inner surface 26 of the tine or element anchor 19.

Figure 5:
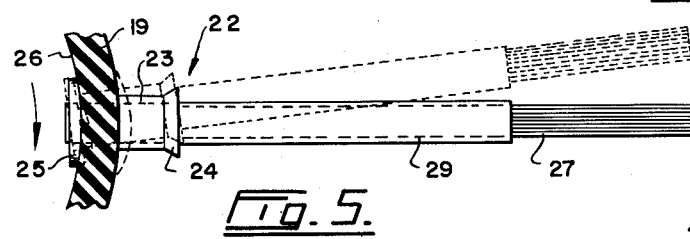
FIGURE 5 is an enlarged fragmentary side elevation showing one of my tines or elements within a portion of the flexible anchor.

The tines or elements in FIGURES 1, 2 and 5 consist of a plurality of nylon or other plastic rods or units having flexible characteristics and indicated by the reference character 27.

The major inner portions 28 of these plastic rods are covered by a relatively hard but flexible sheath 29 all of which passes through the collar 23 and through the anchor plate 25, being held in place by adhesive or other means (not illustrated).

Means collectively designated 30 are provided to hold the anchor strip together with the tines or elements in position around the tube or member 16. These means take the form of an annular half ring 31 welded to the member 16 as at 32 and being shaped as illustrated in FIGURE 3 with an anchor strip retaining portion 33 formed therein.

A corresponding annular half ring 34, shaped similar to the anchor ring 31 freely engages the opposite side of the anchor strip due to the flanged portion 35 thereof and partially encloses the anchor strip when same is placed around the member 16.

Figures 3, 4, 8:
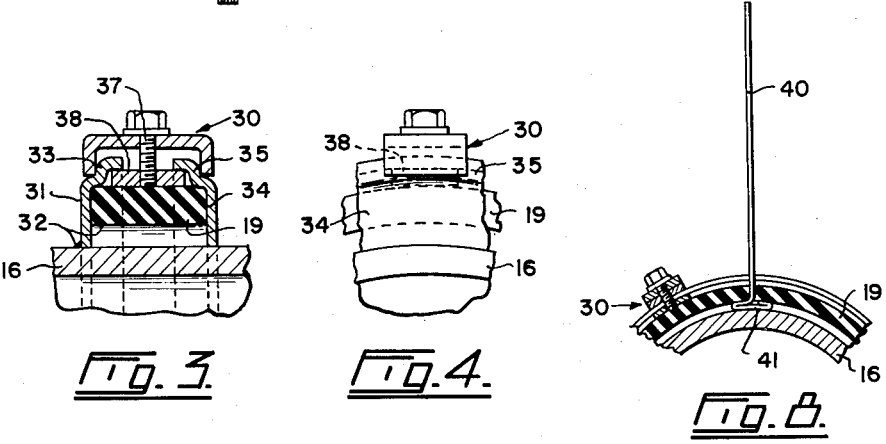
FIGURE 3 is an enlarged transverse fragmentary section taken along the line 3—3 of FIGURE 1.
FIGURE 4 is a side elevational view at right angles to FIGURE 3.
FIGURE 8 is a fragmentary side section of an alternative method of construction and anchoring the tine or element within the resilient anchor.

A plurality of clamp means are provided to hold the ring 34 in the necessary relationship with ring 31, each of these clamping means taking the form of an inverted U-shaped clip 36 engaging over the flange portions 33 and 35 of the half rings and being maintained in position by means of bolt 37 engaging nut plates 38 registering upon the anchor strip 19 as clearly shown in FIGURES 3 and 4.

To assemble the tine or element assemblies, the tines or elements and collars are forced through the apertures 21 within the anchor strip 19 whereupon the anchor strip is wrapped around the member 16 and engaged under the portion 33 of the half ring 31.

The corresponding half ring 34 is then slip up into engagement with the other side of the anchor strip whereupon the clamp nuts 37 engage the nut plates 38 and clamp the two half rings together thus retaining the tine or element assembly in position.

It will be observed that the tines or elements 22 can flex in any direction due to striking stones or other objects and that furthermore the entire tine or element assembly 22 can flex in its anchor 19 as clearly shown in FIGURE 5 wherein the anchor strip 19 has been distorted as illustrated by the dotted lines 39.

FIGURE 8 shows an alternative construction of the tines suitable particularly for steel tines 30 which are pierced through the tine anchor strip 19 being held in position by means of an upset end 31 formed upon the inner end of the tine 30.

FIGURES 9 and 10 show further alternative construction for the tines or elements. FIGURE 9 shows a plastic tine 40 having a button or washer 41 formed on one end thereof.

FIGURE 10 shows a solid plastic tine 42 held in position within anchor 23 and having a sleeve 29 similar to the embodiment shown in FIGURES 1 and 5.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a grain harvester and the like including a rotatable element carrying member located transversely thereof; a plurality of grain pickup element assemblies surrounding and supported by said member in spaced and parallel relationship therealong, each of said assemblies including a circumferential resilient element anchor surrounding said member, means to detachably secure said anchor around said member, and a plurality of flexible pickup elements detachably secured to and extending radially from said resilient anchor in spaced relationship therearound, said means to detachably secure said anchor around said member comprising an annular half retaining ring secured to said member, a corresponding detachable annular half retainer ring surrounding said member, each of said half retainer rings including an annular flange adapted to partially enclose said anchor, and at least one detachable clamp means adapted to engage said halves on the periphery thereof, thereby holding said second half ring in position relative to said first half ring.

2. The device according to claim 1 in which each of said element assemblies comprises an element securing collar extending through said resilient anchor, a flexible element extending through said collar, and a flexible element sheath enclosing the major inner portion of said element.

3. The device according to claim 1 in which said resilient element anchor comprises an elongated resilient strip engageable around said member, the length of said strip being such that the extremities thereof substantially meet one another when said strip is in engagement around said member as aforesaid.

4. The device according to claim 2 in which said resilient element anchor comprises an elongated resilient strip engageable around said member, the length of said strip being such that the extremities thereof substantially meet one another when said strip is in engagement around said member as aforesaid.

References Cited in the file of this patent

UNITED STATES PATENTS

| 2,627,159 | Russell | Feb. 3, 1953 |
| 2,888,993 | Dunning | June 2, 1959 |